United States Patent
Shibata (10) Patent No.: US 8,938,214 B2
(45) Date of Patent: Jan. 20, 2015

(54) WIRELESS COMMUNICATION DEVICE

(75) Inventor: Hiroshi Shibata, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 133 days.

(21) Appl. No.: 13/431,876

(22) Filed: Mar. 27, 2012

(65) Prior Publication Data

US 2012/0320401 A1 Dec. 20, 2012

(30) Foreign Application Priority Data

Jun. 14, 2011 (JP) ................................. 2011-132283

(51) Int. Cl.
*H04M 1/66* (2006.01)
*H04W 12/06* (2009.01)
*H04L 29/06* (2006.01)
*H04W 84/12* (2009.01)

(52) U.S. Cl.
CPC ............. *H04W 12/06* (2013.01); *H04L 63/083* (2013.01); *H04L 63/18* (2013.01); *H04L 63/162* (2013.01); *H04W 84/12* (2013.01)
USPC .......................................... 455/411; 455/410

(58) Field of Classification Search
CPC ...... H04W 12/06; H04W 12/08; H04W 12/12
USPC ........................................................ 455/411
See application file for complete search history.

(56) References Cited

U.S. PATENT DOCUMENTS

| | | | |
|---|---|---|---|
| 2006/0221915 A1* | 10/2006 | Gatta et al. | 370/338 |
| 2010/0260069 A1 | 10/2010 | Sakamoto et al. | |
| 2010/0303001 A1 | 12/2010 | Tamura et al. | |
| 2011/0026504 A1 | 2/2011 | Feinberg | |
| 2011/0075589 A1 | 3/2011 | Bradley et al. | |
| 2011/0122835 A1 | 5/2011 | Naito et al. | |
| 2011/0244897 A1* | 10/2011 | Shibuya | 455/500 |

(Continued)

FOREIGN PATENT DOCUMENTS

| | | |
|---|---|---|
| CN | 102076107 A | 5/2005 |
| CN | 101246459 A | 8/2008 |

(Continued)

OTHER PUBLICATIONS

United States Patent and Trademark Office, Non Final Office Action for U.S. Appl. No. 13/431,851 (related to above-captioned patent application), mailed Aug. 8, 2013.

Wi-Fi Alliance, Wi-Fi Alliance Technical Committee P2P Task Group, "Wi-Fi Peer-to-Peer (P2P) Technical Specification, Version 1.1" (2010), pp. 1-159.

(Continued)

*Primary Examiner* — Mazda Sabouri
(74) *Attorney, Agent, or Firm* — Baker Botts L.L.P.

(57) ABSTRACT

A wireless communication device may receive a first signal from an external device, the first signal being a signal for establishing a wireless connection between the wireless communication device and the external device according to a specific wireless communication scheme. The wireless communication device may judge whether the first signal includes a first type of information or a second type of information. The wireless communication device may cause a display unit to display a displaying screen indicating the authentication information in a case where it is judged that the first signal includes the first type of information, and cause the display unit to display an inputting screen in which the authentication information is to be inputted in a case where it is judged that the first signal includes the second type of information.

18 Claims, 5 Drawing Sheets

(56) References Cited

U.S. PATENT DOCUMENTS

| | | |
|---|---|---|
| 2011/0271334 A1 | 11/2011 | Yang et al. |
| 2012/0051244 A1 | 3/2012 | Nagara |
| 2012/0147268 A1* | 6/2012 | Hassan et al. .............. 348/552 |
| 2012/0320413 A1 | 12/2012 | Nagasaki |
| 2012/0320414 A1 | 12/2012 | Shibata |
| 2013/0148162 A1 | 6/2013 | Park et al. |

FOREIGN PATENT DOCUMENTS

| | | | |
|---|---|---|---|
| CN | 101771586 A | 7/2010 |
| EP | 1959341 A | 8/2008 |
| JP | 2002-152216 A | 5/2002 |
| JP | 2004-357057 A | 12/2004 |
| JP | 2006-165623 A | 6/2006 |
| JP | 2009-089230 A | 4/2009 |
| JP | 2009-301138 A | 12/2009 |
| JP | 2010-187168 A | 8/2010 |
| JP | 2010-278851 A | 12/2010 |
| WO | 2007/061140 A1 | 5/2007 |

OTHER PUBLICATIONS

Wi-Fi Alliance, "Wi-Fi Certified Wi-Fi Protected Setup: Easing the User Experience for Home and Small Office Wi-Fi Networks," Dec. 1, 2010, pp. 1-12.

Wi-Fi Alliance, "Wi-Fi Certified Wi-Fi Direct Personal, Portable Wi-Fi Technology," Oct. 1, 2010, pp. 1-14.

European Patent Office, extended European Search Report for European Patent Application No. 12161560.3 (counterpart European patent application), dated Oct. 31, 2012.

United States Patent and Trademark Office, Final Office Action for U.S. Appl. No. 13/431,851 (related to above-captioned patent application), mailed Dec. 4, 2013.

United States Patent and Trademark Office, Office Action in related U.S. Appl. No. 14/328,017, issued Sep. 23, 2014.

The State Intellectual Property Office of the People'S Republic of China, Notification of First Office Action in counterpart Chinese Patent Application No. 201210085533.5, mailed Aug. 5, 2014.

* cited by examiner

FIG. 5
(Embodiment)

WIRELESS COMMUNICATION DEVICE

CROSS-REFERENCE TO RELATED APPLICATIONS

This application claims priority to Japanese Patent Application No. 2011-132283, filed on Jun. 14, 2011, the contents of which are hereby incorporated by reference into the present application.

TECHNICAL FIELD

A technique disclosed in the present specification relates to a wireless communication device.

DESCRIPTION OF THE RELATED ART

Conventionally, wirelessly connecting a client device with an access point by using a PIN code mode of WPS (Wi-Fi Protected Setup) formulated by Wi-Fi Alliance is known.

SUMMARY

In the present specification, a technique is disclosed for causing a wireless connection between a wireless communication device and an external device to be established appropriately using authentication information.

One technique disclosed in the present application is a wireless communication device. The wireless communication device may comprise one or more processors, and a memory that stores a computer program including instructions executed by the one or more processors. The instructions may cause the one or more processors, when executed by the one or more processors, to function as a receiving controlling unit, a judging unit, and a display controlling unit. The receiving controlling unit may be configured to receive a first signal from an external device, the first signal being a signal for establishing a wireless connection between the wireless communication device and the external device according to a specific wireless communication scheme. The judging unit may be configured to judge whether the first signal includes a first type of information or a second type of information that may be different from the first type of information. The first type of information may be included in the first signal in a case where authentication information for establishing the wireless connection is to be input to the external device. The second type of information may be included in the first signal in a case where the authentication information is to be displayed on the external device. The display controlling unit may be configured to cause a display unit to display a displaying screen indicating the authentication information in a case where it is judged that the first signal includes the first type of information, and cause the display unit to display an inputting screen in which the authentication information may be inputted in a case where it is judged that the first signal includes the second type of information.

Moreover, a method for realizing the wireless communication device is also novel and useful. In addition, a computer program for realizing the wireless communication device and a non-transitory computer readable storage medium that stores the computer program are also novel and useful.

Figure 1:
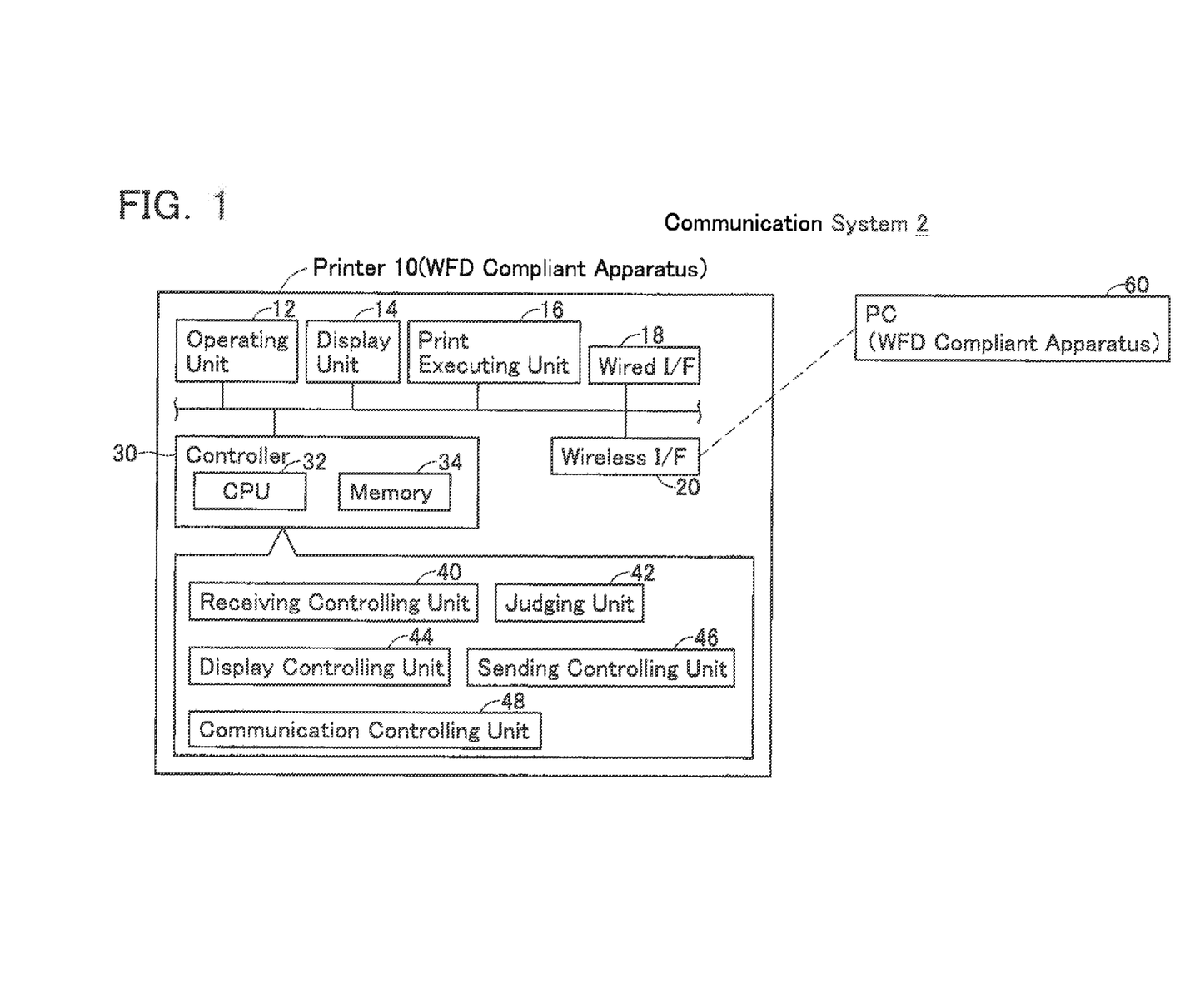
FIG. 1 shows an example of the configuration of a communication system.

EMBODIMENT (Embodiment)
(Configuration of System)
As shown in FIG. 1, a communication system 2 comprises a printer 10 (a peripheral of a PC 60), and the PC 60. The printer 10 and the PC 60 are each capable of executing a wireless communication function in accordance with Wi-Fi Direct (to be described). Moreover, below, Wi-Fi Direct is called "WFD", and the wireless communication function in accordance with Wi-Fi Direct is called a "WFD function". The printer 10 and the PC 60 are capable of Establishing a wireless connection in accordance with WFD, thereby constructing a wireless network. Consequently, the printer 10 and the PC 60 become capable of wirelessly communicating object data of a communication object such as printing data, etc.

(Configuration of Printer 10)
The printer 10 comprises an operating unit 12, a display unit 14, a print executing unit 16, a wired interface 18, a wireless interface 20, and a controller 30. The units 12 to 30 are connected with a bus line (reference number omitted). The operating unit 12 consists of a plurality of keys. A user can give various instructions to the printer 10 by operating the operating unit 12. The display unit 14 is a display for displaying various information. The print executing unit 16 comprises a printing mechanism such as an ink jet method, laser method, etc. printing mechanism, and executes printing according to an instruction from the controller 30. The wired interface 18 is an interface for performing wired communication, and is connected with a wired circuit (e.g., a LAN circuit). The wireless interface 20 is an interface for performing wireless communication.

The controller 30 comprises a CPU 32 and a memory 34. The CPU 32 executes various processes according to a program stored in the memory 34. The memory 34 consists of a ROM, RAM, hard disk, etc. The memory 34 stores the program executed by the CPU 32, and stores data acquired or created in the course of the CPU 32 executing processes. The CPU 32 realizes the functions of a receiving controlling unit 40, a judging unit 42, a display controlling unit 44, a sending controlling unit 46, and a communication controlling it 48 by executing processes according to the program.

(Configuration of PC 60)
The PC 60 comprises a CPU, memory, display, etc. (not shown). The memory of the PC 60 stores a printer driver program for the printer 10. The CPU of the PC 60 can create printing data of a printing object by using the printer driver program. In a state where a wireless connection has been established between the printer 10 and the PC 60, the PC 60 can wirelessly send the printing data to the printer 10.

(WFD)
As described above, the printer 10 and the PC 60 are each capable of executing the WFD function. WFD is a standard formulated by Wi-Fi Alliance. WFD is described in "Wi-Fi Peer-to-Peer (P2P) Technical Specification Version 1.1" created by Wi-Fi Alliance.

In WFD, three states have been defined as the states of the apparatus: Group Owner state (called "G/O state" below), client state, and device state. An apparatus capable of performing the WFD function (i.e., the printer 10, the PC 60, etc.) is capable of selectively operating in one state among the three states.

One wireless network consists of an apparatus in the G/O state and an apparatus in the client state. There can be only one G/O state apparatus present in one wireless network, but one or more client state apparatuses can be present. The G/O state apparatus administrates the one or more client state apparatuses. Specifically, the G/O state apparatus creates an administration list in which identification information (i.e., MAC address) of each of the one or more client state apparatuses is written. When a client state apparatus newly participates in a wireless network, the G/O state apparatus adds the identification information of that apparatus to the administration list, and when the client state apparatus leaves the wireless network, the G/O state apparatus deletes the identification information of that apparatus from the administration list.

The G/O state apparatus is capable of wirelessly communicating object data of a communication object (e.g., data that includes network layer information of the OSI reference model (printing data, etc.)) with an apparatus registered in the administration list, i.e., with an apparatus in the client state. However, with an apparatus not registered in the administration list, the G/O state apparatus is capable of wirelessly communicating data for participating in the wireless network (e.g., data that does not include network layer it (physical layer data such as a Probe Request signal, Probe Response signal, etc.)) but is not capable of wirelessly communicating the object data. For example, the printer 10 that is in the G/O state is capable of wirelessly receiving printing data from the PC 60 that is registered in the administration list (i.e., the PC 60 that is in the client state), but is not capable of wirelessly receiving printing data from a PC that is not registered in the administration list.

Further, the G/O state apparatus is capable of relaying the wireless communication of object data (printing data, etc.) between a plurality of client state apparatuses. For example, in case the PC 60 that is in the client state should wirelessly send printing data to another printer that is in the client state, the PC 60 first wirelessly sends the printing data to the printer 10 that is in the G/O state, and the printer 10 wirelessly sends the printing data to the other printer. That is, the G/O state apparatus is capable of executing the function of an AP (access point) of a wireless network.

Moreover, an apparatus that is not participating in the wireless network (i.e., an apparatus not registered in the administration list) is a device state apparatus. The device state apparatus is capable of wirelessly communicating data for participating in the wireless network (physical layer data such as a Probe Request signal, Probe Response signal, etc.), but is not capable of wirelessly communicating object data (printing data etc.) via the wireless network.

(Mode for Executing WFD Wireless Connection)

A WPS (Wi-Fi Protected Setup) wireless connection mode is used as the mode for executing a WFD wireless connection. The WPS wireless connection mode includes a PBC (Push Button Configuration) mode and a PIN (Personal Identification Number) code mode. In the present embodiment, since the PIN code mode is used, a description relating to the PBC mode is omitted. Below, a summary of the PIN code mode be described.

(PIN Code Mode)

For example, a situation is assumed in which a wireless connection between the printer 10 that is in the device state and the PC 60 that is in the device state is to be established by using the WPS PIN code mode. In such a situation, the user performs a mode selection operation on the operating unit 12 of the printer 10 to select the PIN code mode from among the PBC mode and the PIN code mode. Further, the user performs a mode selection operation on an operating unit of the PC 60 to select the PIN code mode.

In this case, e.g., the printer 10 creates and displays a PIN code. The user inputs the PIN code into the PC 60. Then, the printer 10 and the PC 60 execute G/O negotiation (explained in detail below) for deciding which will assume the G/O state and which will assume the client state.

Next, the printer 10 and the PC 60 execute WPS negotiation. Authentication of the FIN code is performed during the course of this WPS negotiation. Moreover, in the WPS negotiation, the apparatus which should assume the G/O state (e.g., the printer 10) wirelessly sends a wireless profile (SSID, authentication mode, encryption mode, password, etc.), this being information needed to establish a wireless connection, to the apparatus which should assume the client state (e.g., the PC 60). Consequently, the printer 10 and the PC 60 can establish a wireless connection by using the same wireless profile.

(PIN Code Mode Process)

Next, the contents of a PIN code mode process executed by the printer 10 of the present embodiment will be described with reference to FIG. 2. The PIN code mode process is started when the mode selection operation to select the PIN code mode is performed by the user on the operating unit 12 of the printer 10. Moreover, when the mode selection operation is performed while the printer 10 is in the G/O state or the device state, the printer 10 executes the PIN code mode process While maintaining the current state (i.e., the G/O state or the device state), and when the mode selection operation is performed while the printer 10 is in the client state, the printer 10 transfers from the client state to the device state (i.e., the printer 10 leaves the wireless network in which it was participating in the client state), and executes the PIN code mode process in the device state.

In S10, the controller 30 (see FIG. 1) of the printer 10 judges whether the current state of the printer 10 is the G/O state. in the case Where the current state of the printer 10 is the G/O state (the case of YES in S10), the controller 30 proceeds to S40, and in the case where the current state of the printer 10 is the device state (the case of NO in S10), the controller 30 proceeds to S12.

In S12, the controller 30 sequentially executes a Scan process, a Listen process, and a Search process. The Scan process is a process for searching for a G/O state apparatus present in the surroundings of the printer 10. Specifically, in the Scan process, the controller 30 sequentially uses thirteen channels 1ch to 13ch to sequentially send a Probe Request signal wirelessly.

For example, in case an apparatus that is in the G/O state (called "specific apparatus" below) is present in the surroundings of the printer 10, it has been determined in advance that the specific G/O apparatus uses one channel from among 1ch to 13ch. Consequently, the specific G/O apparatus wirelessly receives a Probe Request signal from the printer 10. In this case, the specific G/O apparatus wirelessly sends a Probe Response signal to the printer 10. This Probe Response signal includes information indicating that the specific G/O apparatus is in the G/O state. Consequently, the controller 30 can find the specific G/O apparatus. Moreover, the Probe Response signal further includes information indicating a device name of the specific G/O apparatus and a category (e.g., printer, PC, etc.) of the specific G/O apparatus, and a MAC address of the specific G/O apparatus. Consequently, the controller 30 can acquire information relating to the specific G/O apparatus.

Moreover, e.g., in case an apparatus that is in the device state (called "specific device apparatus" below) is present in the surroundings of the printer 10, it has been determined in advance that the specific device apparatus uses one channel from among 1ch, 6ch, 11ch. Consequently, the specific device apparatus also wirelessly receives a Probe Request signal from the printer 10. In this case, the specific device apparatus wirelessly sends a Probe Response signal to the printer 10. However, this Probe Response signal includes information indicating that the apparatus is in the device state, and does not include information indicating that the apparatus is in the G/O state. Further, even if an apparatus that is in the client state wirelessly receives a Probe Request signal from the printer 10, the apparatus that is in the client state does not wirelessly send a Probe Response signal to the printer 10.

Consequently, in the Scan process, the controller 30 can appropriately find the specific G/O apparatus.

The Listen process is a process for responding to the Probe Request signal wirelessly sent from the specific device apparatus which is executing the Search process. That is, upon wirelessly receiving the Probe Request signal from the specific device apparatus, the controller 30 wirelessly sends a Probe Response signal. This Probe Response signal includes information indicating that the printer 10 is in the device state, information indicating the device name of the printer 10 and the category of the printer 10, and the MAC address of the printer 10. The specific device apparatus can find the printer 10 by means of the controller 30 sending the Probe Response signal.

In the Search process, the controller 30 sequentially uses the three channels 1ch, 6ch, 11ch to sequentially send a Probe Request signal wirelessly. Thereby, the controller 30 wirelessly receives a Probe Response signal from the specific device apparatus. This Probe Response signal includes information indicating that the specific device apparatus is in the device state, information indicating the device name of the specific device apparatus and the category of the specific device apparatus, and a MAC address of the specific device apparatus. Thereby, the controller 30 can find the specific device apparatus. Moreover, the specific G/O apparatus, also, can wirelessly send a Probe Response signal to the printer 10 in response to the Probe Request signal sent in the Search process of the printer 10. However, this Probe Response signal includes information indicating that the apparatus is in the G/O state, and does not include information indicating that the apparatus is in the device state. Further, as described above, even if an apparatus that is in the client state wirelessly receives a Probe Request signal from the printer 10, the apparatus that is in the client state does not wirelessly send a Probe Response signal to the printer 10. Consequently, in the Search process, the controller 30 can appropriately find the specific device apparatus.

Next, in S14, the receiving controlling unit 40 (see FIG. 1) judges whether a connection request has been wirelessly received from another apparatus. Moreover, the connection request includes OSI reference model physical layer data, and does not include data that is a layer higher than the physical layer (e.g., network layer). That is, the receiving controlling unit 40 executes communication of the physical layer with the other apparatus, and wirelessly receives a connection request. According to this confirmation, the printer 10 may appropriately receive the connection request from the other apparatus. In case the receiving controlling unit 40 has received a connection request (the case of YES in S14), the process proceeds to S42, and in case the receiving controlling unit 40 has not received a connection request (the case of NO in S14), the process proceeds to S16.

In S16, the display controlling unit 44 (see FIG. 1) causes an apparatus list to be displayed in the display unit 14. The controller 30 can find the specific tilt) apparatus in the Scan process (see S12), and can find the specific device apparatus in the Search process (see S12). The display controlling unit 44 causes information relating to the apparatuses found in S12 (i.e., the information acquired in S12) to be displayed in the display unit 14. In the example of FIG. 2, in S16, information (G/O state, printer, MAC address) relating to an apparatus corresponding to a device name "XXX", and information (device state, printer, MAC address) relating to an apparatus corresponding to a device name "YYY" is displayed in the display unit 14.

The user can learn the apparatuses present in the surroundings of the printer 10 by looking at the apparatus list displayed in S16, and can perform an apparatus selection operation on the operating unit 12 to select which apparatus should establish a wireless connection with the printer 10. When the apparatus selection operation has been performed, the process proceeds to S18. Moreover, below, the apparatus selected by the apparatus selection operation (e.g., the PC 60) is called an "object apparatus".

In S18, the display controlling unit 44 causes a display/input selection screen to be displayed in the display unit 14, this prompting the user to select causing the PIN code to be displayed in the printer 10 (i.e., inputting the PIN code into the object apparatus), or inputting the PIN code into the printer 10 (i.e., causing the PIN code to be displayed in the object apparatus). The user can perform an operation on the operating unit 12 to select display or input. In this case, the process proceeds to S19.

In S19, the display controlling unit 44 causes a flag indicating that the operation to select display or input has been performed by the user (called "user selection flag" below) to be stored in the memory 34. When S19 ends, the process proceeds to S20.

In S20, the display controlling unit 44 judges whether the result of selection by the user in the display/input selection screen is "display" or "input". In case the result of selection by the user is "display" (the case of YES in S20), the process proceeds to S22, and in case the result of selection by the user is "input" the case of NO in S20), the process proceeds to S26.

In S22, the display controlling unit 44 creates a PIN code in a random manner, and causes a displaying screen showing the PIN code to be displayed in the display unit 14. Thereby, by looking at the display unit 14, the user can learn the PIN code, and consequently can input the PIN code into the object apparatus. When S22 ends, the process proceeds to S24.

In S24, the sending controlling unit 46 (see FIG. 1) causes a flag to be stored in the memory 34, this flag (called "displaying screen flag" below) indicating that a displaying screen showing the PIN code has been displayed in the printer 10. When S24 ends, the process proceeds to S50.

On the other hand, in S26, the display controlling unit 44 causes an inputting screen into which the PIN code is input to be displayed in the display unit 14. Consequently, by operating the operating unit 12, the user can input the PIN code displayed in the object apparatus into the inputting screen. When S26 ends, the process proceeds to S28.

Next, in S28, the sending controlling unit 46 causes a flag to be stored in the memory 34, this flag (called "inputting screen flag" below) indicating that the inputting screen into which the PIN code is input has been displayed in the printer 10. When S28 ends, the process proceeds to S50.

Further, as described above, in case it was determined in S10 that the current state of the printer 10 is the G/O state (the case of NO in S10), the process proceeds to S40. In this case, the processes S12 to S20 are not executed. In S40, the receiving controlling unit 40 (see FIG. 1) monitors whether a connection request from another apparatus has been wirelessly received. As described above, the receiving controlling unit 40 executes a physical layer communication with the other apparatus, and wirelessly receives the connection request. According to this configuration, the printer 10 may appropriately receive a connection request from another apparatus. If the receiving controlling unit 40 wirelessly receives a connection request (the ease of YES in S40), the process proceeds to S42. Moreover, below, the apparatus that is the sending source of the connection request received by the receiving controlling unit 40 is also called an "object apparatus".

Next, the judging unit 42 analyses the connection request received by the receiving controlling unit 40. In case the displaying screen (see S22 of FIG. 2) was displayed in the object apparatus, the object apparatus wirelessly sends a connection request (i.e., a displaying screen signal) to the printer 10, this connection request including information (called "displaying information" below) indicating that a displaying screen showing the PIN code has been displayed. In ease the inputting screen (see S26 of FIG. 2) was displayed in the object apparatus, the object apparatus wirelessly sends a connection request to the printer 10, this connection. request including information (called "inputting information" below) indicating that the inputting screen into which the PIN code is input has been displayed. Moreover, below, the connection request that includes the displaying information is called a "displaying screen signal", and the connection request that includes the inputting information is called an "inputting screen signal". The judging unit 42 analyses the connection request, and judges whether the displaying information or the inputting information is included in the connection request.

In case the displaying information is included in the connection request, i.e., in case the displaying screen signal was received (the case of YES in S42), the controller 30 sends an NG signal to the object apparatus, then proceeds to S26 and S28. That is, the display controlling unit 44 causes the inputting screen to be displayed in the display unit 14 (S26), and the sending controlling unit 46 causes the inputting screen flag to be stored in the memory 34 (S28). On the other hand, in case the inputting information is included in the connection request, i.e., in case the inputting screen signal was received (the case of NO in S42), the controller 30 sends an NG signal to the object apparatus, then proceeds to S22 and S24. That is, the display controlling unit 44 causes the displaying screen to be displayed in the display unit 14 (S22), and the sending controlling unit 46 causes the displaying screen flag to be stored in the memory 34 (S24).

(Wireless Connection Process)

Figure 3:
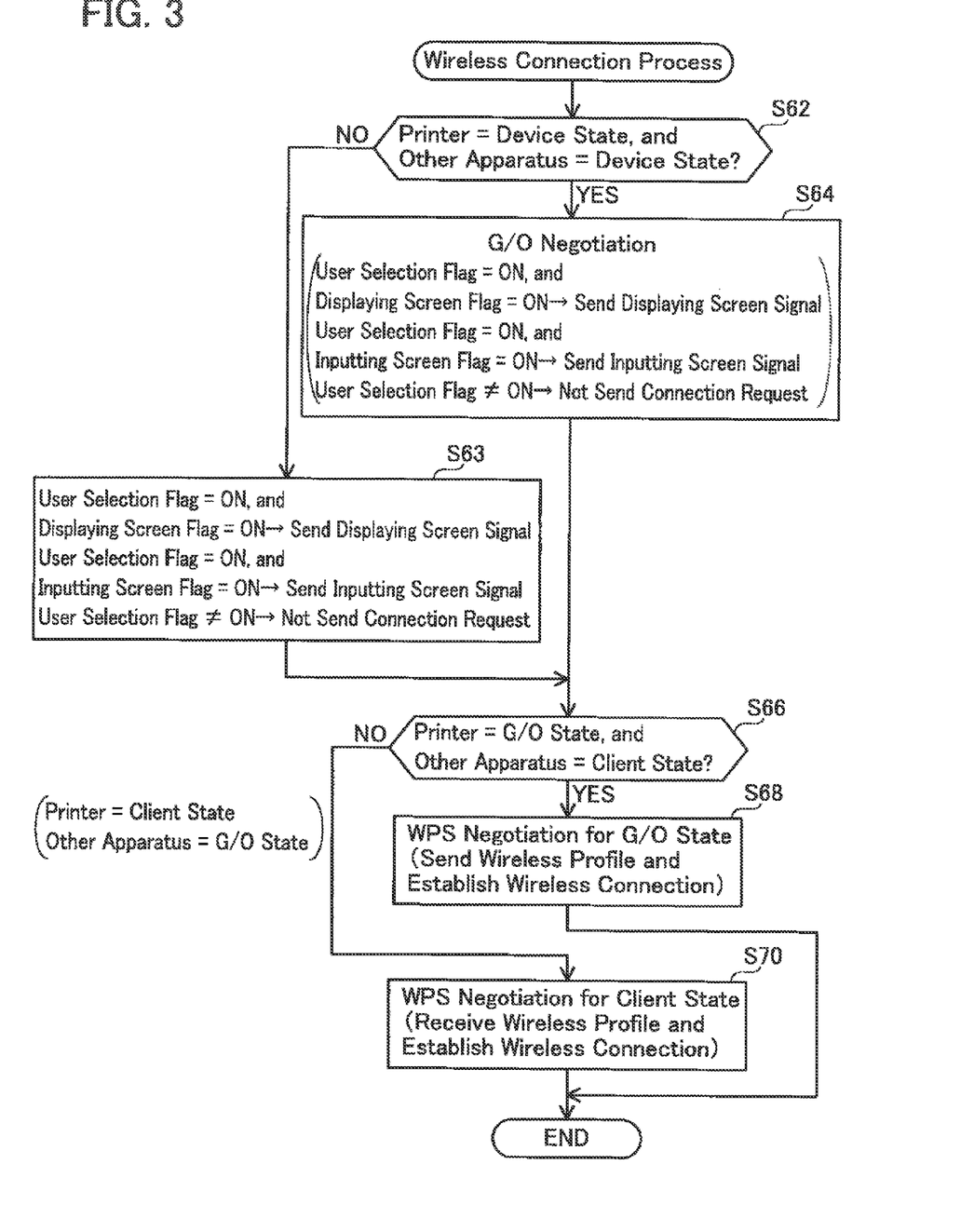
FIG. 3 shows a flowchart of a wireless connection process.

In S50, the controller 30 (see FIG. 1) executes the wireless connection process. As shown in FIG. 3, in S62 the communication controlling unit 48 judges whether the current state of the printer 10 is the device state and the current state of the object apparatus is the device state. In the case of YES in S62 (the current state of the printer 10=device state, and the current state of the object apparatus=device state), the process proceeds to S64.

In S64, the communication controlling unit 48 executes a G/O negotiation with the object apparatus. As described above, only one G/O state apparatus can be present in one wireless network. Consequently, the communication controlling unit 48 executes the G/O negotiation, determining one apparatus from among the printer 10 and the object apparatus as the G/O, and determining the other apparatus as the client.

Specifically, e.g., in case the user selection flag (S19 of FIG. 2) and the displaying screen flag (S24 of FIG. 2) are being stored in the memory 34, the sending controlling unit 46 wirelessly sends a connection request that includes the displaying information, i.e., a displaying. screen signal, to the object apparatus. Further, e.g., in case the user selection flag (S19 of FIG. 2) and the inputting screen flag (S28 of FIG. 2) are being stored in the memory 34, the sending controlling unit 46 wirelessly sends a connection request that includes the inputting information, i.e., an inputting screen signal, to the object apparatus. As described above, when the selection of the user is performed in S20, the printer 10 can send an appropriate connection request (i.e., a displaying screen signal or an inputting screen signal) to the object apparatus in accordance with the selection of the user. Moreover, in case the user selection flag (S19 of FIG. 2) is not being stored in the memory 34 (the case of YES in S40 of FIG. 2), the sending controlling unit 46 does not send a connection request to the object apparatus.

Moreover, when the printer 10 has wirelessly sent the displaying screen signal to the object apparatus, in case the PIN code has been input into the inputting screen that is being displayed in the object apparatus, the object apparatus usually wirelessly sends an OK signal to the printer 10. Further, When the printer 10 has wirelessly sent the inputting screen signal to the object apparatus, in case the displaying screen is being displayed in the object apparatus, the, object apparatus usually wirelessly sends an OK signal to the printer 10.

By contrast, when the printer 10 has wirelessly sent the displaying screen signal to the object apparatus, in case the inputting screen is not being displayed in the object apparatus, or in case the PIN code has not been input into the inputting screen that is being displayed in the object apparatus, the object apparatus wirelessly sends an NO signal to the printer 10. Further, when the printer 10 has wirelessly sent the inputting screen signal to the object apparatus, in case the displaying screen is not being displayed in the object apparatus, the object apparatus wirelessly sends an NG signal to the printer 10. Moreover, upon receiving the NG signal from the object apparatus, the sending controlling unit 46 regularly sends a connection request (a displaying screen signal or an inputting screen signal) to the object apparatus for a fixed period, until an OK signal from the object apparatus is received.

Moreover, in case the sending controlling unit 46 does not send a connection request in S64 (i.e., in case the user selection flag is not being stored in the memory 34), the receiving controlling unit 40 waits for a fixed period until a connection request (a displaying screen signal or an inputting screen signal) from the object apparatus is received. Moreover, at this juncture, in case the displaying screen is not being displayed in the display unit 14, the controller 30 wirelessly sends an OK signal to the object apparatus upon re-receiving an inputting screen signal from the object apparatus. Further, in case the inputting screen is being displayed in the display unit 14, and the PIN code has been input into the inputting screen, upon receiving a displaying screen signal from the object apparatus, the controller 30 wirelessly sends an OK signal to the object apparatus, Moreover, in case the inputting screen is being displayed in the display unit 14, and the PIN code has not been input into the inputting screen, upon receiving a displaying screen signal from the object apparatus, the controller 30 wirelessly sends an NG signal to the object apparatus.

Next, the communication controlling unit 48 (see FIG. 1) wirelessly sends information indicating G/O priority of the printer 10 to the object apparatus, and wirelessly receives information indicating G/O priority of the object apparatus from the object apparatus. Moreover, the G/O priority of the printer 10 is an index indicating the priority with which the printer 10 should become the GM, and is predetermined in the printer 10. Similarly, the G/O priority of the object apparatus is an index indicating the priority with which the object apparatus should become the G/O. For example, an apparatus (e.g., a PC) in which CPU and memory capacity are comparatively high can execute other processes rapidly while operating as a G/O. Consequently, in this type of apparatus, the G/O priority is usually set such that the priority of becoming G/O is high. On the other hand, e.g., an apparatus in which CPU and memory capacity are comparatively low might not be able to execute other processes rapidly while operating as a G/O. Consequently, in this type of apparatus, the G/O priority is usually set such that the priority of becoming G/O is low.

The communication controlling unit 48 compares the G/O priority of the printer 10 and the G/O priority of the object apparatus, determines the apparatus (the printer 10 or the object apparatus) with the higher priority as the G/O, and determines the apparatus (the object apparatus or the printer 10) with the lower priority as the client. The object apparatus determines the WO and the client based on the G/O priority of the printer 10 and the G/O priority of the object apparatus using the same method as the printer 10. When the G/O negotiation of S64 ends, the process proceeds to S66.

Moreover, upon ending the G/O negotiation of S64, the printer 10 transfers from the device state to the determined state (Le., the G/O state or the client state). Further, the object apparatus also transfers from the device state to the determined slate (i.e., the client state or the GM state). Moreover, depending on the state of the printer 10, the contents of the subsequent process change (i.e., S68 or S70 (to be described) is executed). According to this configuration, the printer 10 can appropriately communicate (send or receive) a wireless profile (to be described) with the object apparatus, in accordance with the results of the G/O negotiation.

Further, in case it was determined in S62 that the current state of the object apparatus is the G/O state (the case of NO in S62), the printer 10 transfers from the device state or the G/O state to the client state without executing the G/O negotiation of S64. This is because, since only one apparatus in the G/O state can be present in one wireless network, the printer 10 cannot assume the G/O state. Further, in case it was determined in S62 that the current state of the printer 10 is the G/O state, the printer 10 is maintained in the G/O state, which is the current state, without executing the G/O negotiation of S64. In this case, the object apparatus transfers from the device state to the client state.

In the case of NO in S62, in accordance with the flag in the memory 34, as in the case of S64 above, in S63 the sending controlling unit 46 sends a connection request (a displaying screen signal or an inputting screen signal) to the object apparatus, or waits without sending a connection request. That is, in case the user selection flag (S19 of FIG. 2) and the displaying screen flag (S24 of FIG. 2) are being stored in the memory 34, the sending controlling unit 46 wirelessly sends a displaying screen signal to the object apparatus, and in case the user selection flag (S19 of FIG. 2) and the inputting screen flag (S28 of FIG. 2) are being stored in the memory 34, the sending controlling unit 46 wirelessly sends an inputting screen signal to the object apparatus. Further, in case the user selection flag (S19 of FIG. 2) is not being stored in the memory 34, the sending controlling unit 46 does not send a connection request to the object apparatus. Moreover, the displaying screen signal of S63 and the displaying screen signal of S64 have differing packet types. However, both packets include information indicating that a displaying screen is displayed. Further, the inputting screen signal of S63 and the inputting screen signal of S64 have differing packet types. However, both packets include information indicating that an inputting screen is displayed. When S63 ends, the process proceeds to S66.

In S66, the communication controlling unit 48 judges whether the current state of the printer 10 is the G/O state, and whether the current state of the object apparatus is the client state. In the case the current state of the printer 10 is the G/O state and the current state of the object apparatus is the client state (the case of YES in S66), the process proceeds to S68. On the other hand, in the ease that the current state of the printer 10 is the client state and the current state of the object apparatus is the G/O state (the case of NO in S66), the process proceeds to S70.

In S68, the communication controlling unit 48 executes WPS negotiation for the G/O state. Specifically, the communication controlling unit 48 first converts specific data (e.g., packet data communicated last between the printer 10 and the object apparatus) into a hash code by using the PIN code displayed in S22 of FIG. 2 or the PIN code input in S26 of FIG. 2. In this case, the object apparatus, also, converts the specific data into a hash code by using the PIN code displayed in the object apparatus or the PIN code input into the object apparatus.

Either the printer 10 (i.e., the communication controlling unit 48) or the object apparatus judges whether the hash code created by the printer 10 and the hash code created by the object apparatus are matching (i.e., executes authentication of the PIN code). In case the two hash codes match, i.e., in case authentication of the PIN code succeeds, the communication. controlling unit 48 wirelessly sends a wireless profile (SSW, authentication mode, encryption mode, password, etc.), which is needed to establish a wireless connection, to the object apparatus. According to this configuration, in case the printer 10 is operating in the G/O state, the printer 10 can wirelessly communicate the wireless profile with the object apparatus appropriately. Moreover, the authentication mode and the encryption mode are predetermined, Further, the SSID and the password may be created by the communication controlling unit 48 at the time of the process S68, or may be predetermined. Sending the wireless profile to the object apparatus allows the printer 10 and object apparatus to use the same wireless profile.

Moreover, in case the two hash codes do not match, i.e., in case the authentication of the PIN code fails, the communication controlling unit 48 does not send a wireless profile to the object apparatus. In this case, since the WPS negotiation cannot proceed, the controller 30 causes an error screen (not shown) to be displayed in the display unit 14, and ends the wireless connection process of FIG. 3 (i.e., ends the PIN code mode process of FIG. 2) without executing the subsequent processes.

Using the same wireless profile, the printer 10 and the object apparatus wirelessly communicate an Authentication Request, Authentication Response, Association Request, Association Response, and 4way handshake. During this process, the printer 10 and the object apparatus execute various authentication processes such as SSID authentication, authentication mode and encryption mode authentication, password authentication, etc. In case all the authentications succeed, a wireless connection is established between the printer 10 and the object apparatus.

Moreover, if the wireless connection is established in S68, the controller 30 further adds the MAC address of the object apparatus (i.e., the MAC address included in the Probe Response signal received in Scan or Listen of S12) to the administration list. Thereby, it becomes possible to communicate object data (printing data, etc.) of a communication object between the printer 10 that is in the G/O state and the object apparatus that is in the client state. Moreover, the object data includes network layer data, which is a layer higher than the physical layer of the OSI reference model. Consequently, the printer 10 that is in the G/O state can execute wireless communication of the network layer with the object apparatus that is in the client state. Further, it becomes possible for the printer 10 that is in the G/O state to relay wireless communication between the object apparatus which is in the client state and another apparatus which is in the client state and is registered in the administration list.

On the other hand, in S70, the communication controlling unit 48 executes VIPS negotiation for the client state. Specifically, first, the authentication of the PIN code is executed as ire S68. In case the authentication of the PIN code succeeds, the communication controlling unit 48 wirelessly receives a wireless profile (SSID, authentication mode, encryption mode, password, etc.), Which is needed to establish a wireless connection, from the object apparatus. According to this configuration, in case the printer 10 is operating in the client state, the printer 10 can communicate the wireless profile with the object apparatus appropriately. Moreover, in case the authentication of the PIN code fails, the communication controlling unit 48 does not receive a wireless profile from the object apparatus. In this case, since the WPS negotiation cannot proceed, the controller 30 causes an error screen (not shown) to be displayed in the display unit 14, and ends the wireless connection process of FIG. 3 (i.e., ends the PIN code mode process of FIG. 2) without executing the subsequent processes.

The subsequent processes (the communication process such as the Authentication Request, etc.) are the same as S68. Consequently, the printer 10 that is in the client state becomes able to wirelessly communicate object data (printing data, etc.) with the object apparatus that is in the G/O state. Further, it becomes possible for the printer 10 that is in the client state to wirelessly communicate, via the object apparatus that is in the G/O state, object data with another apparatus that is in the client state (i.e., another apparatus registered in the administration list of the object apparatus). When S68 or S70 ends, the wireless connection process of FIG. 3 ends and, further, the PIN code mode process of FIG. 2 ends.

Figure 4:
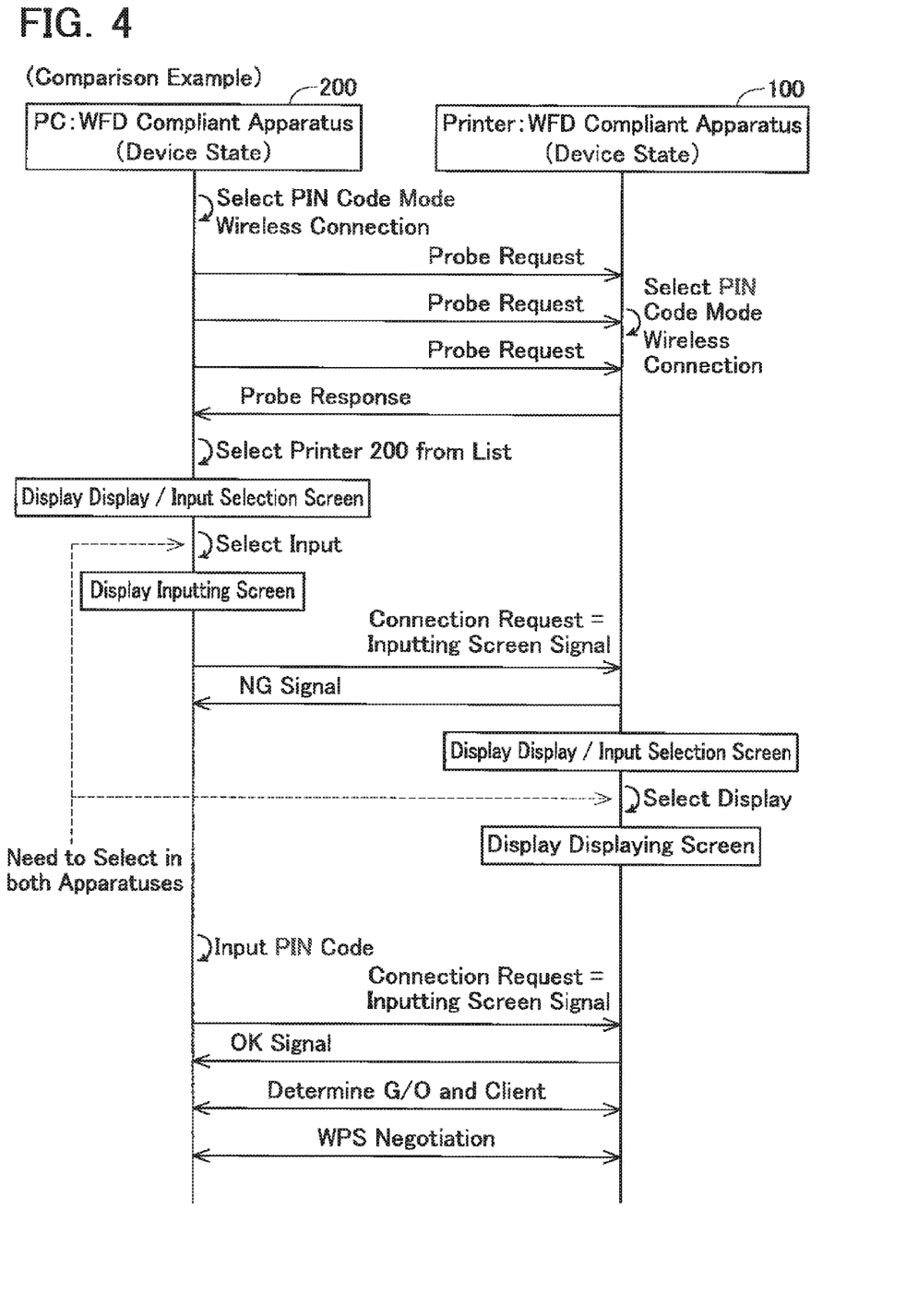
FIG. 4 shows a sequence view of a comparison example.

(Processes Executed by Apparatuses of Comparison Example; FIG. 4)

The contents of processes executed by apparatuses of a comparison example will be described with reference to FIG. 4. In FIG. 4, a situation is assumed in which a wireless connection is to be established by using the WPS PIN code mode between a printer 100 that is in the device state and a PC 200 that is in the device state.

The user performs a mode selection operation on an operating unit of the PC 200 to select the PIN code mode. In this case, the PC 200 executes the Scan process, the Listen process, and the Search process. In the course of the Search process, the PC 200 wirelessly sends a Probe Request signal to the printer 100.

The user further performs a mode selection operation on an operating unit of the printer 100 to select the PIN code mode. In this case, the printer 100 executes the Scan process, the Listen process, and the Search process. In the course of the Listen process, the printer 100 wirelessly sends a Probe Response signal to the PC 200 in response to the Probe Request signal wirelessly received from the PC 200.

Next, the PC 200 causes an apparatus list including information relating to the printer 100 to be displayed, and the user selects the printer 100 from the apparatus list Consequently, the PC 200 causes the display/input selection screen to be displayed. By operating the operating unit of the PC 200, the user selects PIN code display or PIN code input. For example, in case PIN code input is selected by the user, the PC 200 causes the inputting screen to be displayed, then starts G/O negotiation, and wirelessly sends an inputting screen signal to the printer 100. However, since the selection in the display/input selection screen has not yet been executed the printer 100, when the printer 100 receives the inputting screen signal, the printer 100 wirelessly sends an NG signal to the PC 200.

Upon wirelessly receiving the inputting screen signal from the PC 200, the printer 100 causes the display/input selection screen to be displayed. Consequently, the user operates the operating unit of the printer 100 to select PIN code display or PIN code input. Since PIN code input has been selected in the PC 200, the user selects PIN code display in the printer 100. When PIN code display is selected appropriately, the printer 100 causes the displaying screen to be displayed. The user can thus learn the PIN code shown on the displaying screen.

Next, the user inputs the PIN code in the displaying screen being displayed in the printer 100 into the inputting screen being displayed in the PC 200. Consequently, the PC 200 wirelessly re-sends an inputting screen signal to the printer 100. Upon wirelessly receiving the inputting screen signal, the printer 100 wirelessly sends an OK signal to the PC 200. Then, the process for deciding G/O and client (S64 of FIG. 3), and the WPS negotiation (S68 or S70 of FIG. 3) are executed between the printer 100 and the PC 200.

As described above, in the configuration of the comparison example, a display/input selection screen is displayed in each of the printer 100 and the PC 200. In the case of selecting PIN code input in the PC 200, the user must appropriately select PIN code display in the printer 100. If PIN code input were also selected in the printer 100, the inputting screen would be displayed in both the printer 100 and the PC 200, and consequently the user could not learn the PIN code, and could not input the PIN code. Consequently, a wireless connection between the printer 100 and the PC 200 could not be established. Further, similarly, in case of selecting PIN code display in the PC 200, the user must appropriately select PIN code input in the printer 100. If PIN code display were also selected in the printer 100, the displaying screen would be displayed in both the printer 100 and the PC 200, and consequently the user could not input the PIN. Consequently, a wireless connection between the printer 100 and the PC 200 could not be established.

In case the display/input selection screen is displayed in each of the printer 100 and the PC 200, there is the possibility that a user with poor knowledge of wireless communication cannot perform the appropriate selection (i.e., might perform the same selection in the printer 100 and the PC 200). That is, in the configuration of the comparison example, there is the possibility that the user cannot easily cause the wireless connection to be established. By contrast, in the printer 10 of the present embodiment, since the process of FIG. 2 is performed, it is possible to prevent the same selection being made in both of a pair of apparatuses between which a wireless connection is to be established. This point will be described in detail with reference to FIG. 5.

Figure 2:
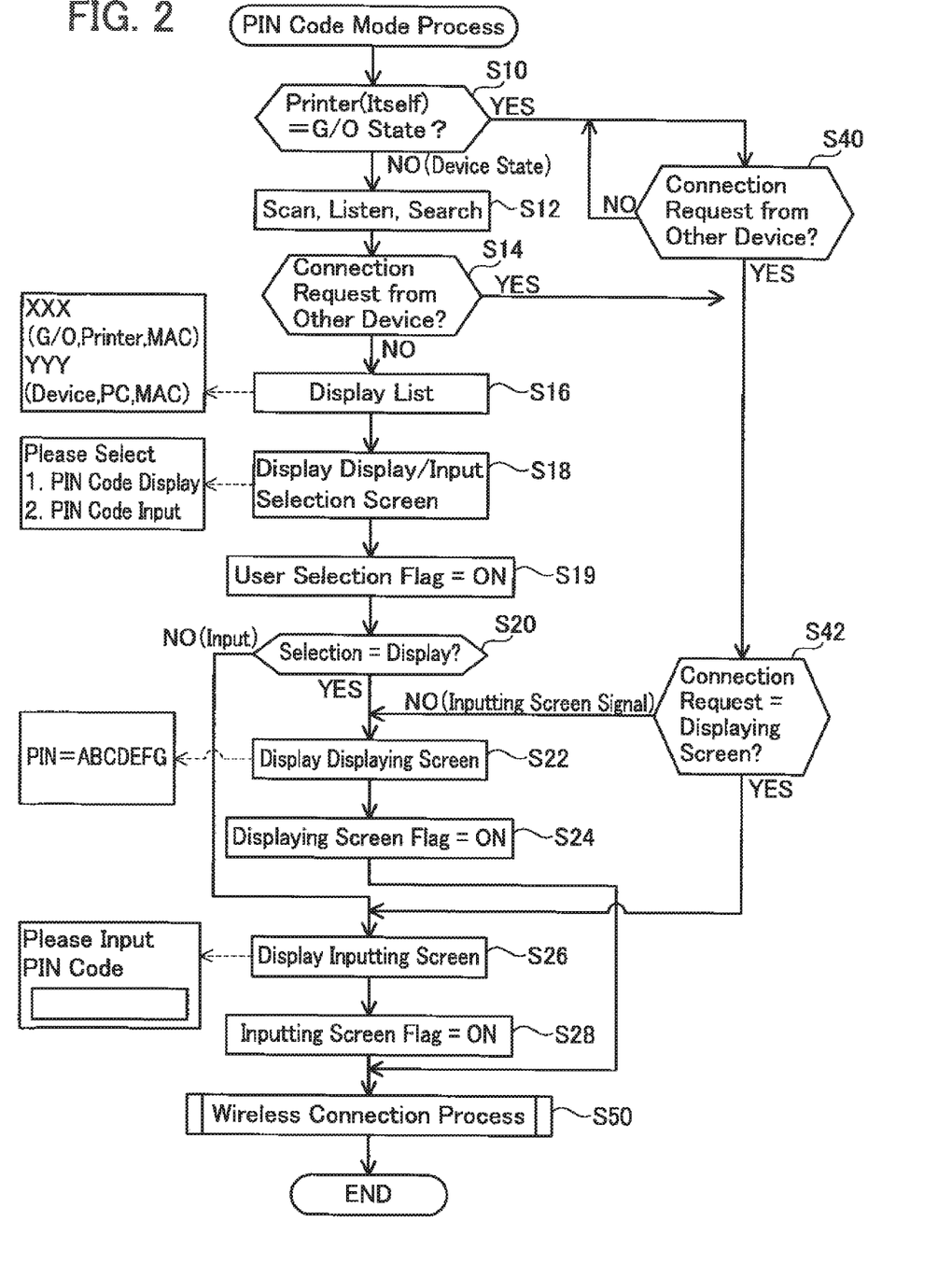
FIG. 2 shows a flowchart of a PIN code mode process.

Moreover, in the flowcharts of FIG. 2 and FIG. 3, sending the NG signal and re-sending the inputting screen signal or the displaying screen signal have been omitted. However, as in the comparison example, the controller 30 of the printer 10 of the present embodiment is configured to send the aforementioned signals in the course of the G/O negotiation of S64 of FIG. 3.

Figure 5:
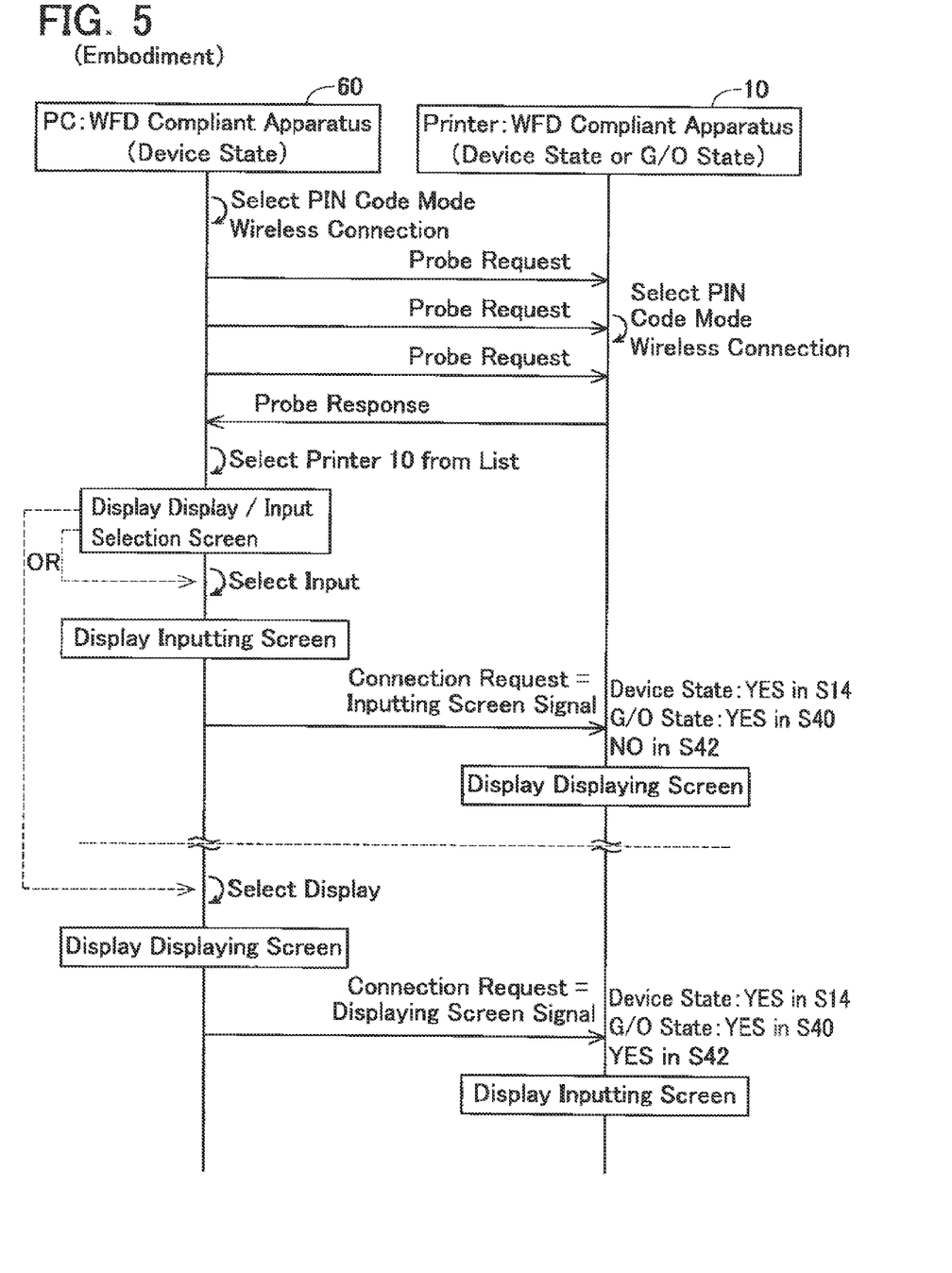
FIG. 5 shows a sequence view of an embodiment.

(Processes Executed by Apparatuses of the Present Embodiment; FIG. 5)

In FIG. 5, a situation is assumed in which a wireless connection is to be established by using the WPS PIN code mode between the printer 10 that is in the device state or the (G/O state and the PC 60 that is in the device state. Moreover, in FIG. 5, sending the NG signal (see FIG. 4) is not shown. The situation until selecting the printer 10 from the apparatus list displayed in the PC 60 is the same as the comparison example. When the printer 10 is selected from the apparatus list, the PC 60 causes the display/input selection screen to be displayed.

(Case where PIN Code Input is Selected in PC 60)

For example, the user operates the operating unit of the PC 60 to select PIN code input. In this case, the PC 60 causes the inputting screen to be displayed, and then wirelessly sends an inputting screen signal to the printer 10.

For example, in case the printer 10 is in the device state (the case of NO in S10 of FIG. 2), upon wirelessly receiving the inputting screen signal from the PC 60, the printer 10 determines YES in S14 of FIG. 2, and then determines NO in S42 of FIG. 2. Consequently, without causing the display/input selection screen to be displayed (i.e., without executing S18 of FIG. 2), the printer 10 automatically causes the displaying screen to be displayed (S22 of FIG. 2). Next, the printer 10 starts the GHQ negotiation, and wirelessly sends a displaying screen signal to the PC 60 (S64 of FIG. 3).

Further, e.g., in case tine printer 10 is in the G/O state (the case of YES in S10 of FIG. 2), upon wirelessly receiving the inputting screen signal from the PC 60, the printer 10 determines YES in S40 of FIG. 2, and then determines NO in S42 of FIG. 2, Consequently, without causing the display/input selection screen to be displayed (i.e., without executing S18 of FIG. 2), the printer 10 automatically causes the displaying screen to be displayed (S22 of FIG. 2). Next, without executing the G/O negotiation, the printer 10 wirelessly sends an inputting screen signal to the PC 60 (S63 of FIG. 3).

Next, the user operates the operating unit of the PC 60 to input the PIN code into the inputting screen that is being displayed in the PC 60. The subsequent processes, (the process for deciding G/O and client, the WPS negotiation, etc.) are the same as in the comparison example.

(Case where PIN Code Display is Selected in PC 60)

For example, the user operates the operating unit of the PC 60 to select PIN code display. In this case, the PC 60 causes the displaying screen to be displayed, and then wirelessly sends a displaying screen signal to the printer 10.

For example, in case the printer 10 is in the device state (the case of NO in S10 of FIG. 2), upon wirelessly receiving the displaying screen signal from the PC 60, the printer 10 determines YES in S14 of FIG. 2, and then determines YES in S42 of FIG. 2. Consequently, without causing the display/input selection screen to be displayed (i.e., without executing S18 of FIG. 2), the printer 10 automatically causes the inputting screen to be displayed (S26 of FIG. 2). Next, the printer 10 starts the G/O negotiation, and wirelessly sends a displaying screen signal to the PC 60 (S64 of FIG. 3).

Further, e.g., in case the printer 10 is in the G/O state (the case of YES in S10 of FIG. 2), upon wirelessly receiving the displaying screen from the PC 60, the printer 10 determines YES in S40 of FIG. 2, and then determines YES in S42 of FIG. 2. Consequently, without causing the display input selection screen to be displayed (i.e., without executing S18 of FIG. 2), the printer 10 automatically causes the inputting screen to be displayed (S26 of FIG. 2). Next, without executing the G/O negotiation, the printer 10 wirelessly sends an inputting screen signal to the PC 60 (S63 of FIG. 3).

Next, the user operates the operating unit 12 of the printer 10 to input the PIN code (the PIN code that is being displayed in the PC 60) into the inputting screen that is being displayed in the printer 10. The subsequent processes (the process for deciding G/O and client, the WPS negotiation, etc.) are the same as in the comparison example.

(Result of Present Embodiment)

According to the present embodiment, as shown in FIG. 5, by analyzing the connection request received from the PC 60, the printer 10 can determine appropriately Whether the PIN code is to be input into the PC 60 (i.e., the connection request=the inputting screen signal), or whether the PIN code is to be displayed in the PC 60 (i.e., the connection request-the displaying screen signal). In case the PIN code is to be input into the PC 60, the printer 10 causes the displaying screen that shows the PIN code to be displayed in the display unit 14, and in case the PIN code is to be displayed in the PC 60, the printer 10 causes the inputting screen into which the PIN code is input to be displayed in the display unit 14.

For example, in case the printer 10 is in the device state, if the display or input of the PIN code is selected in the PC 60 before the display or input of the PIN code was selected in the printer 10, the printer 10 determines YES in S14 of FIG. 2, and does not cause the display/input selection screen to be displayed (S18 is skipped in the case of YES in S14 of FIG. 2). The user does not need to select the display or input of the PIN code in the printer 10. Consequently, the phenomenon can be suppressed in which a wireless connection between the printer 10 and the PC 60 cannot be established due to the user making the same selection (e.g., PIN code input) in the printer 10 and the PC 60. That is, the printer 10 can cause the appropriate screen to be displayed in the display unit 14 in accordance with the contents of the connection request received from the PC 60. Specifically, if the displaying screen is displayed in the PC 60, the printer 10 causes the inputting screen to be displayed in the display unit 14, and if the inputting screen is displayed in the PC 60, the printer 10 causes the displaying screen to be displayed in the display unit 14. Consequently, using the PIN code, the user can cause a wireless connection to be established appropriately between the printer 10 and the PC 60.

Further, as described above, in case the printer 10 is in the G/O state, the printer 10 executes the same type of operation as an AP. Since a conventional AP does not usually have the function of causing the display/input selection screen to be displayed, the display or input of the PIN code is selected in the apparatus that is to be wirelessly connected with the AP. Consequently, in the present embodiment, also, in case the printer 10 is in the G/O state, the printer 10 does not cause the display/input selection screen to be displayed, so that the display or input of the PIN code is selected in the PC 60 that is to be wirelessly connected with the printer 10 (S18 is skipped in the case of YES in S10 of FIG. 2). Consequently, as in the case of causing a wireless connection with a conventional AP, the user can cause a wireless connection to be established appropriately between the printer 10 and the PC 60 by selecting display or input of the PIN code in the PC 60.

(Corresponding Relationships)

The printer 10 and the PC 60 are respectively examples of the "wireless communication device" and the "external device". WFD is an example of the "specific wireless communication mode". The connection request received from the PC 60 in S14 or S40 of FIG. 2, and the connection request sent in S63 or S64 of FIG. 3 are respectively examples of the "first signal" and the "second signal". The inputting information and the displaying information are respectively examples of the "first type of information" and the "second type of information". The PIN code is an example of the "authentication information". Further, the G/O state and the client state are respectively examples of the "parent state" and the "child state". The WO negotiation executed in S64 of FIG. 3 is an example of the "operation negotiation". Further, the network layer and the physical layer of the OSI reference model are respectively examples of the "first layer" and the "second layer".

Variants of the foregoing embodiment are listed below.

(1) The "wireless communication device" is not restricted to the printer 10, but may be another apparatus capable of wireless communication (e.g., a mobile phone, PDA, PC, server, FAX device, copier, scanner, multi-function device, etc.). Further, the "external device" is not restricted to the PC 60, but may be another apparatus capable of wireless communication (e.g., a mobile phone, PDA, server, printer, FAX device, copier, scanner, multi-function device, etc.).

(2) In the foregoing embodiment, the display controlling unit 44 causes the displaying screen, the inputting screen, the display/input selection screen, etc. to be displayed in the display unit 14 provided in the printer 10. Instead, in case the display controlling unit 44 is equipped with a web server function, and a client terminal has accessed the web server of the printer 10, data representing a screen may be provided to the client terminal. In this case, the displaying screen, the inputting screen, the display/input selection screen, etc. are displayed in a display unit of the client terminal. That is, the "display unit" may be a display unit inside the wireless communication device, or may be a display unit outside the wireless communication device (i.e., a display unit configured as a separate body from the wireless communication device).

(3) The "parent state" is not restricted to the WFD G/O state, but may be any state that administrates other devices constituting the wireless network (e.g., administrates a list of information relating to another device, relays wireless communication of another device, etc.). Further, the "child state" is not restricted to the WFD client state, but may be any state managed by a parent state apparatus.

(4) In the foregoing embodiment, the receiving controlling unit 40 wirelessly receives the connection request, and the sending controlling unit 46 wirelessly sends the connection request. Instead, e.g., in case the printer 10 and the PC 60 are connected by a wired line (e.g., a USB cable), the receiving controlling unit 40 may receive the connection request from the PC 60 via the wired line, and the sending controlling unit 46 may send the connection request to the PC 60 via the wired line.

(5) In the foregoing embodiment, in case the user selection flag is not being stored in the memory 34 in S63 or S64 of FIG. 3, the sending controlling unit 46 does not send a connection request. Instead, the sending controlling unit 46 may send a connection request (a displaying screen signal or an inputting screen signal) regardless of whether the user selection flag is being stored in the memory 34 or, without sending a connection request at a constant time, may send a connection request after a constant time has elapsed.

(6) In the foregoing embodiment, the PIN code is used as an example of the "authentication information". Instead, the "authentication information" may be any type of information, as long as it is information for use in authentication for establishing a wireless connection. For example, the "authentication information" may be SSID, user ID, device password, etc.

(7) In the foregoing embodiment, the units 40 to 48 are realized by the CPU 32 of the printer 10 executing processes according to software. Instead, at least one of the units 40 to 48 may be realized by a hardware resource such as a logic circuit.

What is claimed is:

1. A wireless communication device comprising:
one or more processors; and
a memory that stores a computer program including instructions executed by the one or more processors,
wherein the instructions cause the one or more processors, when executed by the one or more processors, to function as:
a receiving controlling unit configured to receive a first signal from an external device, the first signal being a signal for establishing a wireless connection between the wireless communication device and the external device according to a specific wireless communication scheme;
a judging unit configured to judge which of a first type of information or a second type of information that is different from the first type of information is included in the first signal, the first type of information being included in the first signal in a case where authentication information for establishing the wireless connection is to be inputted to a sending source device of the first signal, the second type of information being included in the first signal in a case where the authentication information is to be displayed on the sending source device of the first signal;
a display controlling unit configured to:
cause a display unit to display a displaying screen indicating the authentication information in a case where it is judged that the first signal includes the first type of information, and cause the display unit to display an inputting screen in which the authentication information is to be inputted in a case where it is judged that the first signal includes the second type of information; and
cause the display unit to display a selection screen for causing a selection to be made of whether the authentication information is to be displayed on the wireless communication device or the authentication information is to be inputted in the wireless communication device; and
a sending controlling unit configured to send a second signal to the external device in a case where a selection is performed according to the selection screen before the first signal is received from the external device, the second signal being a signal for establishing the wireless connection between the wireless communication device and the external device according to the specific wireless communication scheme,
wherein the sending controlling unit is configured to:
send the second signal including the second type of information to the external device in a case where it is selected that the authentication information is to be displayed on the wireless communication device which is a sending source device of the second signal, and
send the second signal including the first type of information to the external device in a case where it is selected that the authentication information is to be inputted in the wireless communication device which is the sending source device of the second signal.

2. The wireless communication device as in claim 1, wherein
the display controlling unit is configured not to cause the display unit to display the selection screen in a case where the first signal is received before causing the display unit to display the selection screen.

3. The wireless communication device as in claim 1, wherein
the wireless communication device is configured to be capable of operating selectively in any state among a plurality of states including a parent state performing as a parent station of a wireless network and a child state performing as a child station of the wireless network,
the instructions cause the one or more processors, when executed by the one or more processors, to further function as
a communication controlling unit configured to communicate a wireless profile with the external device, the wireless profile being a profile for establishing the wireless connection,
wherein the communication controlling unit is configured to:
communicate the wireless profile with the external device by sending the wireless profile to the external device in a case where the wireless communication device operates in the parent state, and
communicate the wireless profile with the external device by receiving the wireless profile from the external device in a case where the wireless communication device is operating in the child state.

4. The wireless communication device as in claim 3, wherein
the communication controlling unit is further configured to execute an operation negotiation with the external device after having received the first signal from the external device, the operation negotiation being a negotiation for deciding in which of the parent state and the child state the wireless communication device is to operate, and
the communication controlling unit is configured to execute sending or receiving of the wireless profile according to a result of the operation negotiation.

5. The wireless communication device as in claim 3, wherein
the display controlling unit is configured not to cause the display unit to display the selection screen while the wireless communication device is operating in the parent status.

6. The wireless communication device as in claim 1, wherein
the wireless communication device is configured to be capable of executing a communication of a first layer of an OSI reference model with the external device in a case where the wireless connection is established between the wireless communication device and the external device according to the specific wireless communication scheme, and
the receiving controlling unit is configured to execute a communication of a second layer of the OSI reference model so as to receive the first signal from the external device, the second layer being a lower layer than the first layer.

7. The wireless communication device as in claim 1, wherein
the selection operation is an operation for selecting a PIN code mode from among a PBC mode and the PIN code mode.

8. The wireless communication device as in claim 1, wherein
the executing unit executes the discovery process after causing the wireless communication device to leave an existing wireless connection in response to the selection operation being performed.

9. The wireless communication device as in claim 8, wherein
the wireless communication device is configured to operate selectively in any state among a plurality of states including a parent state performing as a parent station of a wireless network, a child state performing as a child station of the wireless network, and a device state that is different from the parent state and the child state,
the executing unit causes the wireless communication device to leave the existing wireless connection by transferring from the child state to the device state in response to the selection operation being performed.

10. A wireless communication device configured to be capable of operating selectively in any state among a plurality of states including a parent state performing as a parent station of a wireless network and a child state performing as a child station of the wireless network, the wireless communication device comprising:
one or more processors; and
a memory that stores a computer program including instructions executed by the one or more processors,
wherein the instructions cause the one or more processors, when executed by the one or more processors, to function as:
a receiving controlling unit configured to receive a first signal from an external device, the first signal being a signal for establishing a wireless connection between the wireless communication device and the external device according to a specific wireless communication scheme;
a judging unit configured to judge which of a first type of information or a second type of information that is different from the first type of information is included in the first signal, the first type of information being included in the first signal in a case where authentication information for establishing the wireless connection is to be inputted to a sending source device of the first signal, the second type of information being included in the first signal in a case where the authentication information is to be displayed on the sending source device of the first signal;
a display controlling unit configured to cause a display unit to display a displaying screen indicating the authentication information in a case where it is judged that the first signal includes the first type of information, and cause the display unit to display an inputting screen in which the authentication information is to be inputted in a case where it is judged that the first signal includes the second type of information; and
a communication controlling unit configured to communicate a wireless profile with the external device, the wireless profile being a profile for establishing the wireless connection,
wherein the communication controlling unit is configured to:
communicate the wireless profile with the external device by sending the wireless profile to the external device in a case where the wireless communication device operates in the parent state, and
communicate the wireless profile with the external device by receiving the wireless profile from the external device in a case where the wireless communication device is operating in the child state, and the display controlling unit is further configured to cause the display unit to display a selection screen for causing a selection to be made of whether the authentication information is to be displayed on the wireless communication device or the authentication information is to be inputted in the wireless communication device, and the display controlling unit is configured not to cause the display unit to display the selection screen while the wireless communication device is operating in the parent state.

11. The wireless communication device as in claim 10, wherein the display controlling unit is configured not to cause the display unit to display the selection screen in a case where the first signal is received before causing the display unit to display the selection screen.

12. The wireless communication device as in claim 10, wherein the communication controlling unit is further configured to execute an operation negotiation with the external device after having received the first signal from the external device, the operation negotiation being a negotiation for deciding in which of the parent state and the child state the wireless communication device is to operate, and the communication controlling unit is configured to execute sending or receiving of the wireless profile according to a result of the operation negotiation.

13. The wireless communication device as in claim 10, wherein the wireless communication device is configured to be capable of executing a communication of a first layer of an OSI reference model with the external device in a case where the wireless connection is established between the wireless communication device and the external device according to the specific wireless communication scheme, and the receiving controlling unit is configured to execute a communication of a second layer of the OSI reference model so as to receive the first signal from the external device, the second layer being a lower layer than the first layer.

14. The wireless communication device as in claim 10, wherein the selection operation is an operation for selecting a PIN code mode from among a PBC mode and the PIN code mode.

15. The wireless communication device as in claim 10, wherein the executing unit executes the discovery process after causing the wireless communication device to leave an existing wireless connection in response to the selection operation being performed.

16. The wireless communication device as in claim 15, wherein the wireless communication device is configured to operate selectively in any state among a plurality of states including a parent state performing as a parent station of a wireless network, a child state performing as a child station of the wireless network, and a device state that is different from the parent state and the child state, the executing unit causes the wireless communication device to leave the existing wireless connection by transferring from the child state to the device state in response to the selection operation being performed.

17. A non-transitory computer-readable storage medium that stores a computer program for a wireless communication device, the computer program including instructions for causing one or more processors of the wireless communication device to perform:

receiving a first signal from an external device, the first signal being a signal for establishing a wireless connection between the wireless communication device and the external device according to a specific wireless communication scheme;

judging which of a first type of information or a second type of information that is different from the first type of information is included in the first signal, the first type of information being included in the first signal in a case where authentication information for establishing the wireless connection is to be inputted to a sending source device of the first signal, the second type of information being included in the first signal in a case where the authentication information is to be displayed on the sending source device of the first signal;

causing a display unit to display a displaying screen indicating the authentication information in a case where it is judged that the first signal includes the first type of information;

causing the display unit to display an inputting screen in which the authentication information is to be inputted in a case where it is judged that the first signal includes the second type of information;

causing the display unit to display a selection screen for causing a selection to be made of whether the authentication information is to be displayed on the wireless communication device or the authentication information is to be inputted in the wireless communication device; and sending a second signal to the external device in a case where a selection is performed according to the selection screen before the first signal is received from the external device, the second signal being a signal for establishing the wireless connection between the wireless communication device and the external device according to the specific wireless communication scheme;

the sending includes:

sending the second signal including the second type of information to the external device in a case where it is selected that the authentication information is to be displayed on the wireless communication device which is a sending source device of the second signal; and sending the second signal including the first type of information to the external device in a case where it is selected that the authentication information is to be inputted in the wireless communication device which is the sending source device of the second signal.

18. A non-transitory computer-readable storage medium that stores a computer program for a wireless communication device, the computer program including instructions for causing one or more processors of the wireless communication device to perform:

receiving a first signal from an external device, the first signal being a signal for establishing a wireless connection between the wireless communication device and the external device according to a specific wireless communication scheme;

judging which of a first type of information or a second type of information that is different from the first type of information is included in the first signal, the first type of information being included in the first signal in a case where authentication information for establishing the wireless connection is to be inputted to a sending source device of the first signal, the second type of information being included in the first signal in a case where the authentication information is to be displayed on the sending source device of the first signal;

causing a display unit to display a displaying screen indicating the authentication information in a case where it is judged that the first signal includes the first type of information;

causing the display unit to display an inputting screen in which the authentication information is to be inputted in a case where it is judged that the first signal includes the second type of information;

communicating a wireless profile with the external device, the wireless profile being a profile for establishing the wireless connection, wherein the communicating includes communicating the wireless profile with the external device by sending the wireless profile to the external device in a case where the wireless communication device operates in the parent state, and communicating the wireless profile with the external device by receiving the wireless profile from the external device in a case where the wireless communication device is operating in the child state; and causing the display unit to display a selection screen for causing a selection to be made of whether the authentication information is to be displayed on the wireless communication device or the authentication information is to be inputted in the wireless communication device, wherein the selection screen is not displayed while the wireless communication device is operating in the parent state.

* * * * *